United States Patent
Lobinger et al.

(10) Patent No.: US 7,039,409 B2
(45) Date of Patent: May 2, 2006

(54) METHOD FOR MONITORING ADJACENT ZONES IN A MOBILE RADIO TELEPHONE SYSTEM AND A CORRESPONDING MOBILE RADIO TELEPHONE SYSTEM

(75) Inventors: Andreas Lobinger, Miesbach (DE); Bernhard Raaf, Munich (DE); Christian Senninger, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 366 days.

(21) Appl. No.: 10/343,136

(22) PCT Filed: Jul. 24, 2001

(86) PCT No.: PCT/DE01/02790

§ 371 (c)(1),
(2), (4) Date: Jan. 28, 2003

(87) PCT Pub. No.: WO02/11482

PCT Pub. Date: Feb. 7, 2002

(65) Prior Publication Data

US 2003/0181208 A1    Sep. 25, 2003

(30) Foreign Application Priority Data

Jul. 28, 2000  (DE) ................................ 100 36 898

(51) Int. Cl.
*H04Q 7/20* (2006.01)
(52) U.S. Cl. ...................... 455/443; 455/438; 455/436; 370/331
(58) Field of Classification Search ............ 455/552.1, 455/435.1–435.3, 436–443; 370/331
See application file for complete search history.

(56) References Cited

U.S. PATENT DOCUMENTS

| | | | | |
|---|---|---|---|---|
| 6,021,122 A | * | 2/2000 | Tiedemann, Jr. | 370/331 |
| 6,801,772 B1 | * | 10/2004 | Townend et al. | 455/436 |
| 2002/0016173 A1 | * | 2/2002 | Hunzinger | 455/456 |

FOREIGN PATENT DOCUMENTS

| EP | 0 565 506 | 10/1993 |
|---|---|---|
| WO | WO 00/35230 | 6/2000 |

OTHER PUBLICATIONS

XP-002127381—3$^{rd}$ Generation Partnership Project (3GPP): Technical Specification Group (TSG) Radio Access Network (RAN); Working Group 1 (WG1); Physical Layer—Measurements p. 8, line 11-p. 11, line 22.

* cited by examiner

*Primary Examiner*—Lester G. Kincaid
*Assistant Examiner*—Phuoc Doan
(74) *Attorney, Agent, or Firm*—Bell, Boyd, Lloyd LLC

(57) ABSTRACT

A method and system are provided for monitoring adjacent cells in a mobile radio telephone system, in which a mobile station located in a cell of a mobile radio telephone system receives, for purposes of monitoring adjacent cells, transmits signals coded with different cell-specific codes from base stations of adjacent cells and codes and evaluates these in accordance with the respective cell-specific codes, wherein at least the base station currently responsible for the mobile station transmits a signaling information item which informs the mobile station of the codes to be used in the monitoring of adjacent cells and/or of the codes not to be used in monitoring adjacent cells, and the mobile station, in monitoring adjacent cells, only decodes and evaluates the transmit signals of the adjacent cells coded with a code which can be used for the monitoring of adjacent cells in accordance with the signaling information.

13 Claims, 3 Drawing Sheets

| n (decimal) | n (binary) | through mask m<br>x++xxxx+   x=.left out | = pattern 011 |
|---|---|---|---|
| 12 | 00001100 | x00xxxx1 | No |
| 62 | 00111110 | x01xxxx0 | No |
| 112 | 01110000 | x11xxxx0 | No |
| 39 | 00100111 | x01xxxx1 | Yes |
| 43 | 00101011 | x01xxxx1 | Yes |
| 57 | 00111001 | x01xxxx1 | Yes |

METHOD FOR MONITORING ADJACENT ZONES IN A MOBILE RADIO TELEPHONE SYSTEM AND A CORRESPONDING MOBILE RADIO TELEPHONE SYSTEM

BACKGROUND OF THE INVENTION

It is known that conventional mobile radio telephone systems are of cellular configuration; i.e., the respective mobile radio telephone system is formed by a multiplicity of radio cells and a base station is allocated to each radio cell. If a mobile station (for example, a mobile telephone), is located in the geographic area of a radio cell, communication with the mobile station within the mobile radio telephone system takes place between the mobile station and the base station allocated to the current cell. If the mobile station is moving from one cell into another cell, the communication link existing between the mobile station and the base station allocated to the "old" cell must be handed over to the base station allocated to the "new" cell. This process is called "handover".

So that such a handover can be performed as rapidly and as free of interference as possible, it is necessary for the mobile station located in the geographic area of a cell to continuously monitor and evaluate the signals transmitted by the base stations of adjacent cells in order to obtain system information of the adjacent cells which can be used for setting up communication between the base station of the new cell and the mobile station as rapidly as possible when entering into an adjacent new cell.

This monitoring of adjacent cells by the mobile station is made more difficult due to the fact that the base stations in the individual cells use different scrambling codes. For the mobile station located in a cell, this means that it must be continuously adjusted for decoding and evaluating the transmit signals from base stations of adjacent cells in accordance with the different-scrambling codes. The more adjacent cells there are, the longer the monitoring of adjacent cells will take.

At national boundaries which, as a rule, also represent separating lines between two different mobile radio telephone network operators, the case may occur that the two network operators of different nationalities use the same frequency band. If a mobile station of one network operator is close enough to the border of the other network operator, the mobile station can receive the transmit signal of the cell of the other network operator on the other side of the border. In UMTS (Universal Mobile Telecommunication System) systems, for example, the signals received by the mobile station are unambiguously allocated to a cell or to a network operator by reading a system information item which is transmitted via the so-called broadcast control channel (BCCH) of the base station of the respective cell.

Reading the system information item of an adjacent cell is a time-consuming process so that, for example, at a national boundary, the case may occur that there is only one adjacent cell of the same operator for a cell in which the mobile station is currently located whereas there are several adjacent cells of the other network operator so that the system information items of the adjoining cells of the other network operator must be read and evaluated during the monitoring of adjacent cells. In other words, the mobile station needs a large amount of time for identifying the signal received from a network operator. Cumulatively, this time can become very large if there is a very large number of adjacent cells of a foreign network operator transmitting at the same frequency as one's own network operator; i.e., if a very large number of adjacent cells of a foreign network operator are visible at the same frequency for the mobile station.

To illustrate, a dashed national boundary is shown in FIG. 5 which separates a cellular mobile radio telephone network of a network operator A and a cellular mobile radio telephone network of a network operator B. According to FIG. 5, the mobile radio telephone network A includes individual cells A0–A6 whereas the mobile radio telephone network B includes individual cells B0–B6. If, for example, a mobile station of network operator A is located in cell A6, the mobile station can monitor both the adjacent cells A3 and A4 of its own mobile radio telephone network A and the adjacent cells B0, B3, B4 and B1 of the foreign mobile radio telephone network B. That is, the mobile station reads both system information of cells A3 and A4 and system information of cells B0, B3, B4 and B1 even though this would actually only be required for cells A3 and A4 since cells B0, B3, B4 and B1 are cells of a foreign mobile radio telephone network.

The present invention is directed toward providing a method for monitoring adjacent cells in a mobile radio telephone system, and a correspondingly designed mobile radio telephone system, via which the time needed for monitoring adjacent cells can be reduced.

SUMMARY OF THE INVENTION

According to the present invention, signaling information is transmitted to the mobile station located in a cell from the base station of the corresponding cell, which signaling information informs the mobile station about the scrambling codes to be used or not to be used during the monitoring of adjacent cells. In this manner, the transmit signals of the adjacent cells, to be observed during the monitoring of adjacent cells, or, respectively, the corresponding scrambling codes can be delimited and thus the monitoring of adjacent cells can be accelerated in that the mobile station is only informed about the scrambling codes used by the adjacent cells of its own network operator and, respectively, the scrambling codes used by the adjacent cells of a foreign network operator are excluded from the monitoring of the adjacent cells. This assumes that the individual adjacent cells in each case use different scrambling codes which is necessary in the case of adjacent network operators which use the same frequency, even in accordance with the current state of the art, by using common advanced planning of the scrambling codes used in the individual cells.

The present invention is not restricted to the preferred field of application of the scrambling codes but can be applied generally to all possible types of cell-specific codes via which the base stations of the individual cells generate a transmit signal containing, in particular, the system information of the corresponding cell, the present invention being applicable, in particular, in UMTS mobile radio telephone networks.

The signaling information informing the mobile station of the codes to be used or not to be used in the monitoring of adjacent cells is preferably provided in the system information of the current cell. In this case, in principle, it would be sufficient if this signaling is transmitted in each case in the cells of a mobile radio telephone network close to the border; i.e., in the cells immediately adjoining another mobile radio telephone network.

So that it is not necessary to report all codes to be used or not to be used for the monitoring of adjacent cells with the aforementioned signaling information, this information also can be transmitted in correspondingly coded form in order to reduce the signaling expenditure.

Thus, for example, it is possible to use the signaling information to report only the boundaries of the area in which the scrambling codes to be used or not to be used for the monitoring of adjacent cells are located. In general, all scrambling codes used in the adjacent cells can be combined in subsets and only an information item designating the required subset can be transmitted so that, in principle, only a number for designating the required subspace or the required subset needs to be transmitted in this exemplary embodiment.

Another exemplary embodiment which allows a relatively large amount of freedom to the network operators when issuing the scrambling codes and which can be coded using relatively few bits provides mapping of individual decimal scrambling codes of the adjacent cells in binary form and selection of certain bits of the binary scrambling codes with the aid of a corresponding mask. If the bits of the individual scrambling codes selected by the mask correspond to a corresponding pattern, this means for the mobile station that the corresponding scrambling codes are to be used or not to be used in monitoring the adjacent cells. In this type of signaling, only the mask and the required pattern need to be reported to the mobile station in the form of system information.

According to a further exemplary embodiment of the present invention, it is proposed to use scrambling codes which are in each case aligned with the same compass directions in the individual mobile radio telephone networks or countries. In particular, this relates to the scrambling codes used in the cells close to the border. In the interior of the country, in contrast, arbitrary scrambling codes can be used. The alignment of the scrambling codes oriented in accordance with the compass directions can be effected, for example, in such a manner that certain bits of the scrambling codes to be used or not to be used for monitoring the adjacent cells are specified in each case at the corners of the individual mobile radio telephone networks corresponding to the same compass direction. Thus, for example, the last two bits of the scrambling codes to be used or not to be used for monitoring the adjacent cells can be specified in each case, for example, at the corners of the individual mobile radio telephone networks whereas only one of these last two bits of the scrambling codes is specified in the cells close to the border between two corners of a mobile radio telephone network; i.e., in a transition zone between two corners. In this manner, only the current geographic position of the mobile station within the respective mobile radio telephone network needs to be transmitted for signaling the scrambling codes to be used or not to be used in monitoring the adjacent cells which only requires three bits. Depending on this information about its own current geographic position, the mobile station can draw direct conclusions about the scrambling codes to be used in each case for monitoring the adjacent cells.

Using this exemplary embodiment, it is possible to reduce the time required for monitoring adjacent cells with particularly little signaling expenditure and, moreover, collisions can be reliably avoided since due to the identical alignment of the scrambling codes in accordance with the compass directions, provided in the individual adjacent mobile radio telephone networks or countries, the same scrambling codes cannot be used in adjacent cells or different networks.

Additional features and advantages of the present invention are described in, and will be apparent from, the following Detailed Description of the Invention and the Figures.

DETAILED DESCRIPTION OF THE INVENTION

Figures 1, 2:
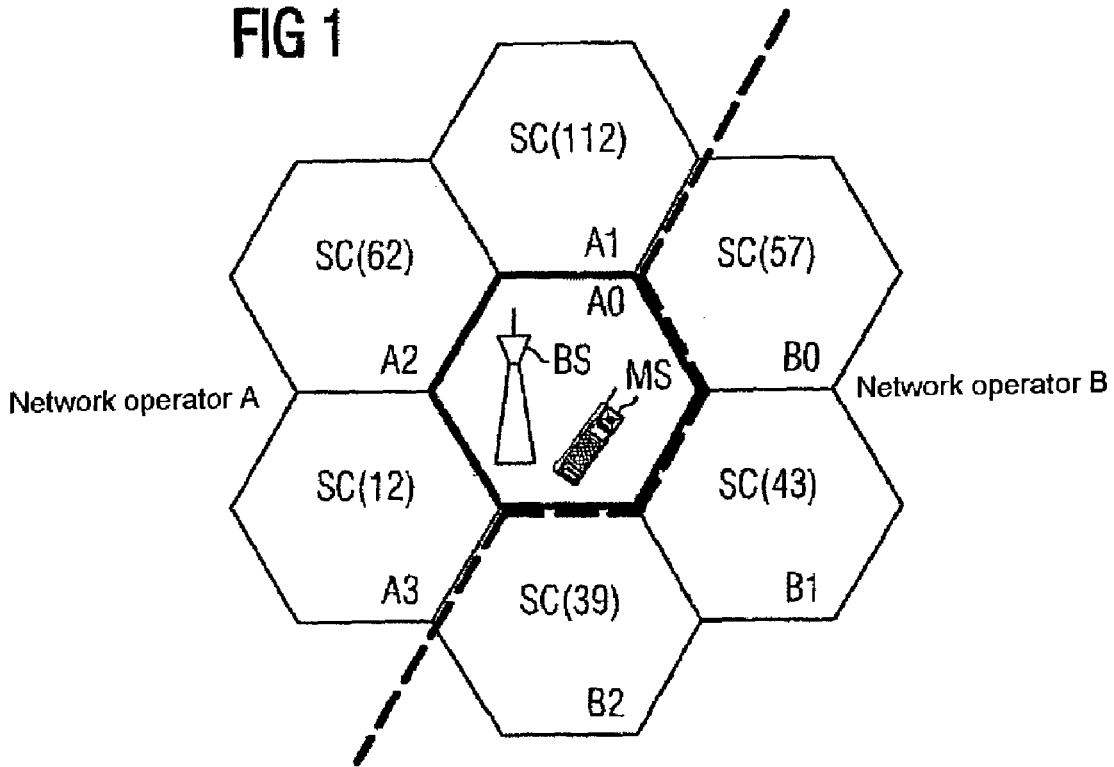
FIG. 1 shows a diagrammatic representation for explaining, via an exemplary embodiment, the principle forming the basis of the present invention.
FIG. 2 shows a chart for explaining a further exemplary embodiment of the present invention.

In FIG. 1, two mobile radio telephone networks of a network operator A and of a network operator B, separated by a national border, are shown. Mobile radio telephone network A includes radio cells A0–A3 and mobile radio telephone network B includes radio cells B0–B2. To each cell, a base station is allocated which is responsible for communication with a mobile station within the geographic area of the corresponding cell. FIG. 1 only shows the corresponding base station BS for cell A0. It is assumed that a mobile station MS is currently located in cell A0.

In each cell, the corresponding base station uses another scrambling code, assuming that the use of scrambling codes of the two adjoining network operators A and B has been jointly planned. FIG. 1 shows the scrambling codes used by the corresponding cells in the form SC(n), where SC(n) is the scrambling code with the ordinal number n.

Each base station of the individual cells, particularly the base stations of cells A0, A1 and A3 and, respectively, B0–B2, which are close to the border, have a list of the scrambling codes used in the adjacent cells of the same network operator and the scrambling codes used in adjacent cells of the adjoining network operator. In the example shown in FIG. 1, this means for cell A0 or the corresponding base station BS that in this list, scrambling codes n=(12, 62, 112) are marked as scrambling codes of its own network operator and scrambling codes n=(39, 43, 57) are marked as scrambling codes of a foreign network operator. Transmitting this list in the form of corresponding signaling information to the mobile station MS located in the geographic area of cell A0 informs the mobile station MS that only the scrambling codes with n=(12, 62, 112) are to be used for monitoring adjacent cells and scrambling codes with n=(39, 43, 57) are not to be used for monitoring adjacent cells.

Depending on the network topology, however, this list with own or foreign scrambling codes can become relatively long so that the signaling complexity also correspondingly can become relatively extensive. In the text which follows, therefore, exemplary embodiments are shown in which signaling of the scrambling codes to be used or not to be used for monitoring adjacent cells is possible with reduced expenditure.

Thus, for example, it is possible to use the signaling information transmitted from the base station BS of cell A0 to mobile station MS to report only an area in which the scrambling codes to be used or not to be used for monitoring adjacent cells are located. Thus, it is only necessary to transmit two numbers, namely the beginning and the end of the corresponding area, to the mobile station MS. For the example shown in FIG. 1, this means that the base station BS only needs to transmit the area boundaries "39" and "57" to the mobile station MS in order to report the scrambling codes to be used for monitoring adjacent cells.

A further possibility for signaling with little expenditure is subdividing the scrambling codes used in the adjacent cells into a number of subspaces or subsets so that it is only necessary to transmit a number for designating the subset with the scrambling codes required for monitoring adjacent cells to the mobile station MS. In the example shown in FIG. 1, for example, the scrambling codes of the cells A1–A3 of the same mobile radio telephone network A, which are adjacent to cell A0, and the scrambling codes of the cells B0–B2, which are adjacent to cell A0, of the foreign mobile radio telephone network can be combined in subsets in such a manner that the scrambling codes of the adjacent cells of their own mobile radio telephone network A all have the property n=even where the scrambling codes of the adjacent cells of the foreign mobile radio telephone network B have the property n=odd.

At points at which more than two different mobile radio telephone networks meet one another, this dividing of the scrambling codes can be continued where, for example, the scrambling codes of the adjacent cells of their own mobile radio telephone network A generally meet the property n mod p, p being the number of meeting mobile radio telephone networks.

FIG. 2 shows a further exemplary embodiment of the present invention for signaling the scrambling codes to be used in monitoring adjacent cells with little expenditure, the example shown in FIG. 2 allowing a relatively large amount of freedom to the network operators in issuing the scrambling codes and being codeable with a relatively small number of bits.

FIG. 2 shows the individual scrambling codes shown in FIG. 1 and the corresponding ordinal numbers of the cells adjacent to cell A0 both in decimal and in binary form. A mask m is defined which only selects certain bits of the individual binary scrambling codes. If the bits selected by the mask m form a particular pattern, the pattern "011" in the exemplary embodiment shown in FIG. 2, this means for the mobile station MS that the corresponding scrambling code is not to be used in monitoring adjacent cells.

In the exemplary embodiment shown in FIG. 2, with m of length 8 bits, it is only necessary to specify the mask m with 8 bits and the pattern with 3 bits to be monitored for coding the system information. The information of the mask m or, respectively, of the corresponding rule, which 3 bits are to be selected from the 8 bits of the ordinal number n of the individual scrambling codes, could be coded with only 6 bits since there are only 56 possibilities of selecting three bits from eight bits.

Figure 3:
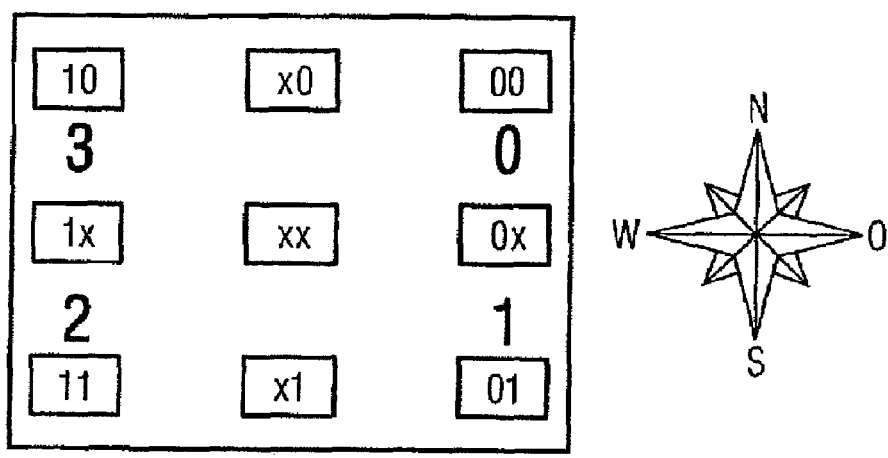
FIGS. 3 and 4 show representations for explaining a further exemplary embodiment of the present invention.
Figure 4:
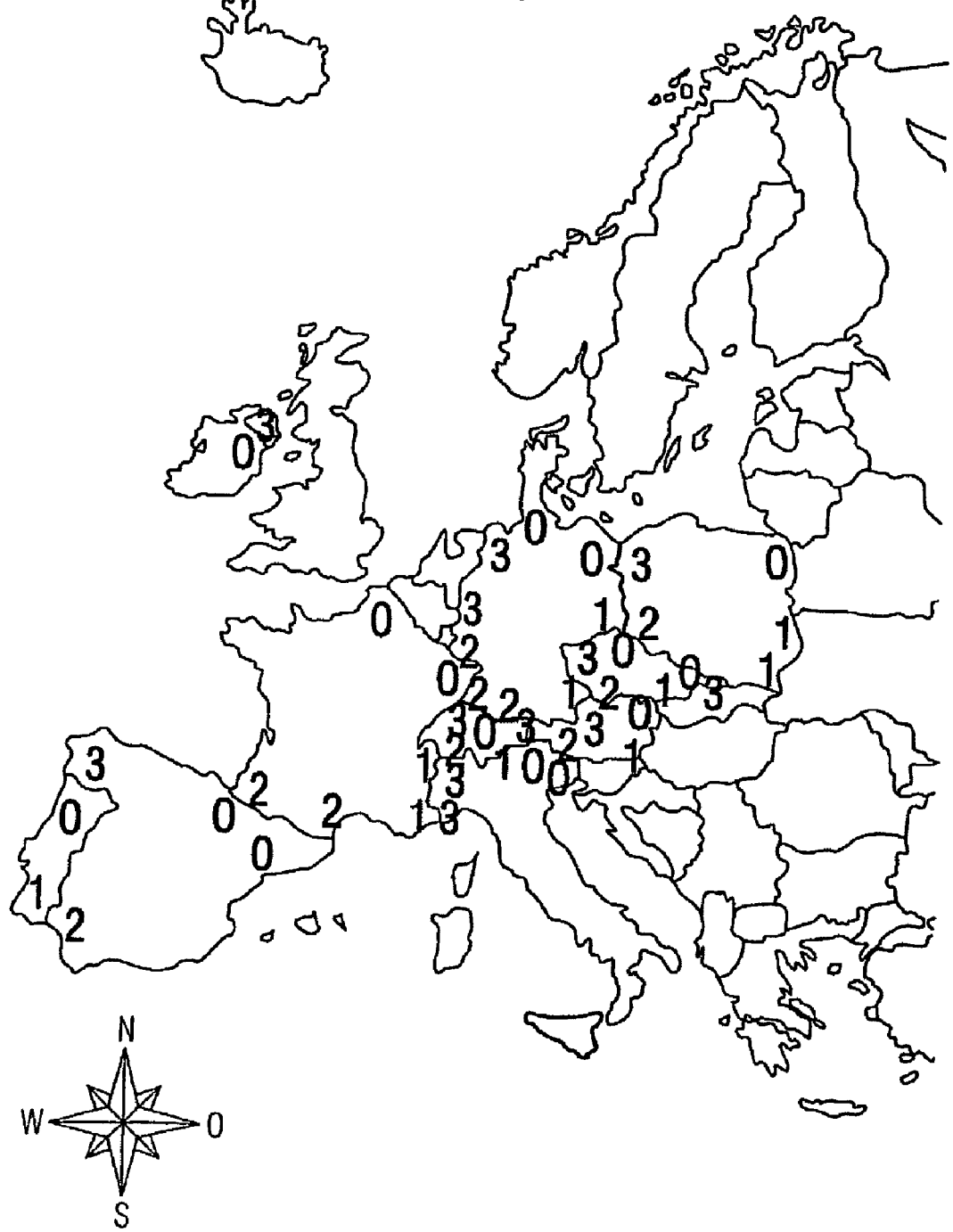

FIG. 3 and FIG. 4 show a further exemplary embodiment of the present invention which enables the time required for monitoring adjacent cells to be shortened with particularly low signaling expenditure.

The assumption is here that the scrambling codes used in the individual cells are defined in accordance with the arrangement shown in FIG. 3 in all mobile radio telephone networks or countries; particularly, in the mobile radio telephone networks or countries adjoining one another. FIG. 3 always indicates, by way of example, the allocation of the last two bits of the binary scrambling codes or, respectively, a number associated with this allocation, the individual rectangles in each case including groups of cells.

As is shown in FIG. 3, various scrambling codes are permitted within a country or mobile radio telephone network since the last two bits of these scrambling codes are occupied by "xx". Whereas the assignment is arbitrary in the interior of the country, the last two bits of the scrambling codes used in the corresponding cells are specified in the four corners of the country or mobile radio telephone network, respectively. Thus, for example, only scrambling codes the last two bits of which are occupied by "00" are used in all cells corresponding to the north-eastern corner, etc. For the edge or border areas, in contrast, only one of these bits is specified so that, for example, only scrambling codes, the last-but-one bit of which is occupied by "0" are used for the cells which are located close to the border between the north-eastern corner and the south-eastern corner.

If the mobile radio telephone network or country considered in each case does not have a rectangular shape according to FIG. 3, the principle must be correspondingly generalized.

Naturally, a different association between the directions and possible scrambling codes is also possible; e.g., the arrangement according to FIG. 3 can be rotated and/or mirrored or it can be generalized to a larger number of directions, (e.g., 8 directions specified by 3 bits of the scrambling code).

To inform the mobile station, which, for example, is located in a cell close to the border, of the scrambling codes to be used for monitoring adjacent cells, it is only necessary to inform the mobile station of an identifier designating the current geographic position of the mobile station within the corresponding mobile radio telephone network. Since, according to the arrangement shown in FIG. 3, a distinction is made between eight different compass directions, 3-bit signaling is adequate for this. If, for example, the mobile station is informed in this way that it is located in the north-eastern corner of the corresponding mobile radio telephone network, the mobile station can derive from this fact that it should only use scrambling codes the last two bits of which are occupied by "00" for monitoring adjacent cells. All other scrambling codes are not used by the mobile station for monitoring adjacent cells.

Figure 5:
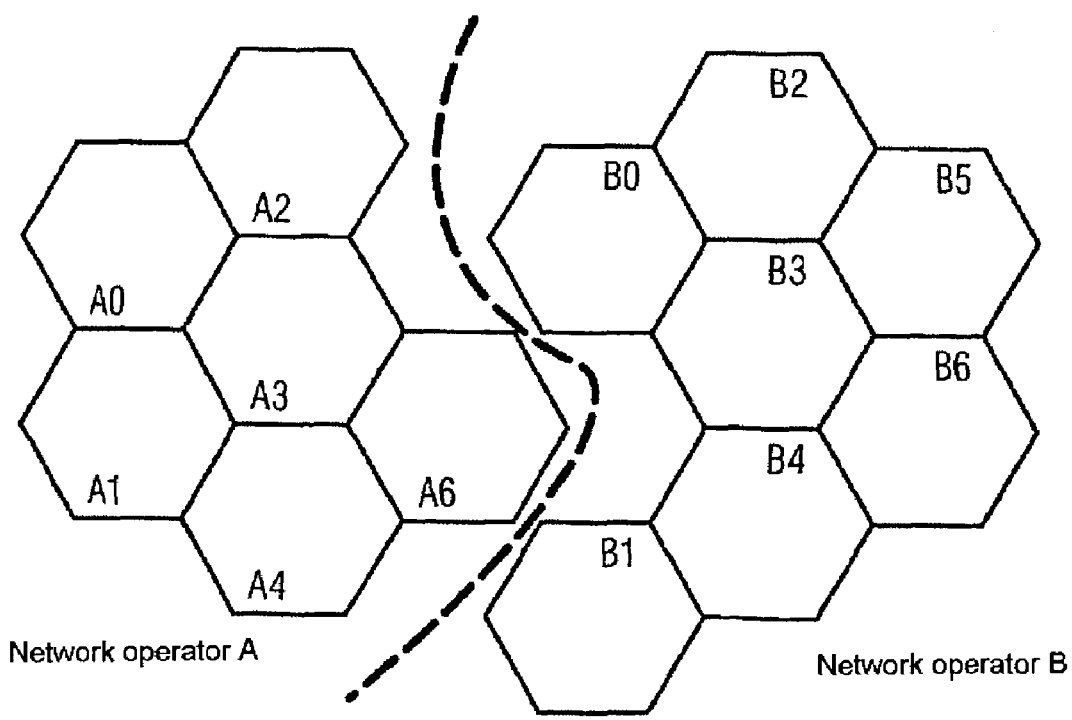
FIG. 5 shows a cell mobile radio network for explaining the problem forming the basis of the present invention.

FIG. 5 shows for the example of European mobile radio telephone networks or, respectively, European mobile radio telephone network operators how the arrangement shown in FIG. 4 can be mapped onto the individual countries or mobile radio telephone networks. In each case, the north-eastern corner is designated by "0", the south-eastern corner by "1", the north-western corner by "3" and the south-western corner by "2" (compare also FIG. 3).

As also can be seen from FIG. 4, it is not possible for collisions to occur; i.e., it is possible for the same scrambling codes to be used in adjacent cells of different countries or mobile radio telephone network operators since the same arrangement (compare FIG. 3) is used in all countries or mobile radio telephone networks for allocating or specifying the scrambling codes, and a national border or corner at which a number of countries meet cannot be located in the same compass direction seen from all the countries. For example, a point cannot be interpreted at the same time as the south-eastern corner by two (or more) adjacent countries or a border cannot be simultaneously the southern border of two countries.

Although the present invention has been described with reference to specific embodiments, those of skill in the art will recognize that changes may be made thereto without departing from the spirit and scope of the present invention as set forth in the hereafter appended claims.

The invention claimed is:

1. A method for monitoring adjacent cells in a mobile radio telephone system, in which a mobile station located in a cell of the mobile radio telephone system receives, for purposes of monitoring adjacent cells, transmit signals coded with different cell-specific codes from base stations of adjacent cells and codes and evaluates the transmit signals in accordance with the respective cell-specific codes, the method comprising the steps of:

transmitting, via at least the base station currently responsible for the mobile station, signaling information which informs the mobile station of at least one of the codes to be used in the monitoring of adjacent cells and the codes not to be used in monitoring adjacent cells, wherein the signaling information informs the mobile station of a particular mask and a particular bit pattern; and decoding and evaluating, via the mobile station in monitoring adjacent cells using the mask and/or bit pattern, the transmit signals of the adjacent cells coded with a code which can be used for the monitoring of adjacent cells in accordance with the signaling information.

2. A method for monitoring adjacent cells in a mobile radio telephone system as claimed in claim 1, wherein the codes are scrambling codes.

3. A method for monitoring adjacent cells in a mobile radio telephone system as claimed in claim 1, the method further comprising the step of transmitting the signaling information via at least base stations of cells arranged at a border between one mobile radio telephone network telephone operator and another mobile radio telephone network operator, in which one of the codes to be used in accordance with the signaling information from monitoring adjacent cells correspond to adjacent cells of the same network operator, and the codes not to be used according to the signaling information for monitoring adjacent cells correspond to adjacent cells of the other network operator.

4. A method for monitoring adjacent cells in a mobile radio telephone system as claimed in claim 1, wherein the signaling information is transmitted as system information.

5. A method for monitoring adjacent cells in a mobile radio telephone system as claimed in claim 1, wherein each base station transmitting the signaling information has at least one of a list about the codes to be used in monitoring the adjacent cells and a list about the codes not to be used in monitoring the adjacent cells.

6. A method for monitoring adjacent cells in a mobile radio telephone system as claimed in claim 1, wherein the signaling information informs the mobile station of an area in which one of the codes to be used and the codes not to be used for monitoring the adjacent cells are located.

7. A method for monitoring adjacent cells in a mobile radio telephone system as claimed in claim 1, the method further comprising the steps of:

combining the codes used in the adjacent cells in subsets, with one subset including the codes to be used in monitoring the adjacent cells; and informing the mobile station, via the signaling information, of the subset with the code to be used in monitoring the adjacent cells.

8. A method for monitoring adjacent cells in a mobile radio telephone system as claimed in claim 1, wherein certain bits are selected according to the mask from a binary representation of the individual codes of the adjacent cells, and the mobile station uses for the monitoring of adjacent cells only codes the bits of which, selected by the mask, one of correspond to the particular bit pattern and do not correspond to the particular bit pattern.

9. A method for monitoring adjacent cells in a mobile radio telephone system as claimed in claim 1, the method further comprising the steps of:

defining, in the individual cells of the mobile radio telephone system, the codes used by the respective base station in accordance with a geographic position of the respective cell in the mobile radio telephone system;

informing the mobile station, via the signaling information, of a current geographic position of the mobile station within the mobile radio telephone system; and drawing conclusions, via the mobile station, about the codes used in the adjacent cells about its own geographic position within the mobile radio telephone system and using the codes for monitoring the adjacent cells.

10. A method for monitoring adjacent cells in a mobile radio telephone system as claimed in claim 9, wherein for cells arranged within a same geographic area of the mobile radio telephone system, at least one bit of the code used in the corresponding cells is identically specified, two bits being identically specified particularly for cells located in corner areas of the mobile radio telephone system whereas at least one bit of the codes used in the cells is identically specified for cells of the mobile radio telephone system arranged in edge areas with one another.

11. A method for monitoring adjacent cells in a mobile radio telephone system as claimed in claim 9, wherein a plurality of adjacent mobile radio telephone systems are provided and, in each mobile radio telephone system, the codes used in the corresponding cells are defined in accordance with a same arrangement in accordance with the geographic position of the respective cell in the respective mobile radio telephone system.

12. A mobile radio telephone system, comprising:

a plurality of cells;

a plurality of base stations, each cell being associated with one of the base stations, with each base station generating a transmit signal coded with a particular cell-specific code; and a mobile station located in a particular cell of the mobile radio telephone system, for monitoring adjacent cells, receiving the transmit signals from the base stations of adjacent cells, and decoding and evaluating the transmit signals in accordance with the respective cell-specific code;

wherein at least the base station currently responsible for the mobile station, of the cell in which the mobile station is currently located, transmits signaling information which informs the mobile station of at least one of the codes to be used in monitoring the adjacent cells and the codes not to be used in monitoring the adjacent cells and wherein the signaling information informs the mobile station of a particular mask and a particular bit pattern, and wherein the mobile station receives and evaluates the signaling information and, in monitoring the adjacent cells, only decodes and evaluates the coded transmit signals of the adjacent cells according to the mask and/or bit pattern which can be used for monitoring the adjacent cells in accordance with the signaling information.

13. A mobile radio telephone system as claimed in claim 12, wherein the mobile radio telephone system is a UMTS mobile radio telephone system.

* * * * *